United States Patent
Pacher et al.

(10) Patent No.: US 6,869,692 B2
(45) Date of Patent: Mar. 22, 2005

(54) BIMETAL SAW BAND

(75) Inventors: Oskar Pacher, Graz (AT); Werner Lenoir, Unna (DE)

(73) Assignee: Stahlwerk Ergste Westig GmbH (DE)

( * ) Notice: Subject to any disclaimer, the term of this patent is extended or adjusted under 35 U.S.C. 154(b) by 170 days.

(21) Appl. No.: 10/360,199

(22) Filed: Feb. 6, 2003

(65) Prior Publication Data

US 2003/0152477 A1 Aug. 14, 2003

(30) Foreign Application Priority Data

Feb. 9, 2002 (DE) .......................................... 102 05 403

(51) Int. Cl.[7] .......................... C22C 38/42; C22C 38/44; B32B 15/00
(52) U.S. Cl. ....................... 428/683; 428/685; 148/335; 420/107; 420/109; 420/102; 420/101; 83/835
(58) Field of Search ............................... 420/102, 101, 420/107, 109; 148/335; 75/246; 428/683, 685; 83/835

(56) References Cited

U.S. PATENT DOCUMENTS

| | | | | |
|---|---|---|---|---|
| 4,058,650 A | * | 11/1977 | Kiyonaga et al. ........... | 428/683 |
| 5,091,264 A | * | 2/1992 | Daxelmueller et al. ..... | 428/685 |
| 5,417,777 A | * | 5/1995 | Henderer ..................... | 148/334 |
| 5,863,358 A | * | 1/1999 | Krzysztalowicz ........... | 148/333 |
| 6,272,963 B1 | * | 8/2001 | Fukumoto ..................... | 83/788 |

* cited by examiner

Primary Examiner—Deborah Yee
(74) Attorney, Agent, or Firm—Cook, Alex, McFarron, Manzo, Cummings & Mehler, Ltd.

(57) ABSTRACT

Bimetal saw band comprising a support band of high microstructural stability and fatigue strength, comprising 0.25 to 0.35% of carbon, 0.3 to 0.5% of silicon, 0.8 to 1.5% of manganese, 1.0 to 2.0% of molybdenum, 1.5 to 3.5% of chromium, 0.5 to 1.5% of nickel, 0.5 to 2.5% of tungsten, 0.15 to 0.30% of vanadium, 0.05 to 0.10% of niobium, 0.05 to 1.0% of copper, up to 0.2% of aluminum, up to 1% of cobalt, remainder iron including melting-related impurities, and tooth tips made from a steel with high wear resistance, comprising 1.0 to 2.0% of carbon, 3 to 6% of chromium, 1 to 5% of vanadium, 3 to 10% of molybdenum, 4 to 10% of tungsten, 4 to 10% of cobalt, up to 1% of silicon, up to 1% of manganese, up to 0.5% of niobium, up to 0.5% of nitrogen, remainder iron including melting-related impurities.

7 Claims, 3 Drawing Sheets

BIMETAL SAW BAND

Figure 1:
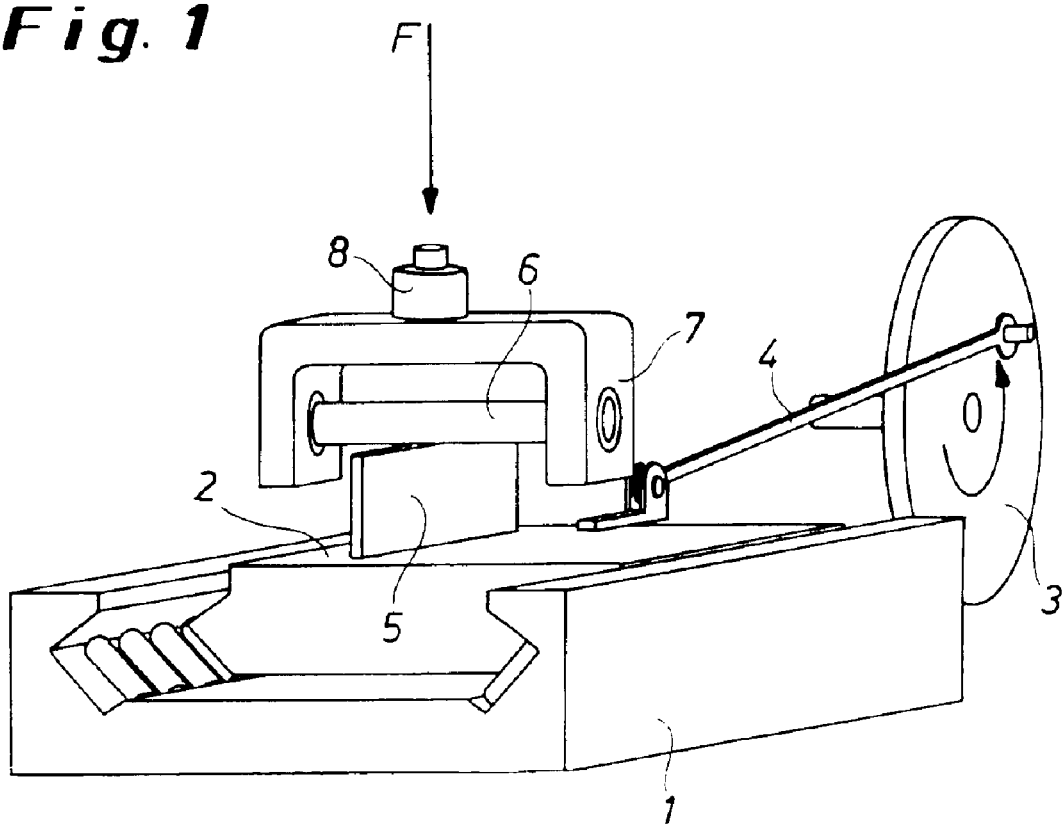

This application claims priority from German Patent Application 102 05 403.7-14, filed Feb. 9, 2002.

The invention relates to a bimetal saw band, in which at least the tooth tips consist of a wear-resistant steel and the support band consists of a relatively tough steel.

Saw bands, including compass saws, have to have a high dimensional stability and a high wear resistance and also have to be able to cope with the high loads resulting from compressive, bending and shear forces even at the not inconsiderable temperatures which result from the friction between saw band and material being cut. This applies in particular to saw bands which run at high speed and are subject to considerable bending when they are diverted through 180°.

Since it is difficult to combine the required properties in a single material, bimetal saw bands nowadays usually comprise a relatively tough support band with a high bending fatigue strength and a cutting part, which is likewise in band form, made from a high-speed steel of low toughness but high wear resistance. The width of the cutting band is such that at least the tooth tips of the saw band or blade or also the cutting teeth as a whole can be machined out of it.

EP 0 569 346 A1 has also already disclosed a bimetal saw band or blade comprising a steel support band comprising 0.20 to 0.40% of carbon, 2.5 to 5.0% of chromium, 2.0 to 3.0% of molybdenum, 0.03 to 0.04% of vanadium and, as grain-refining agent, in total less than 0.01% of niobium and titanium, firstly, and a cutting band made from a high-speed steel comprising 0.65 to 1.8% of carbon, 3.0 to 6.0% of chromium, 4.0 to 12.0% of molydenum and 0.5 to 5.0% of vanadium. A particular characterizing feature of this saw band is the simultaneous presence of chromium, vanadium and molybdenum in both materials and the fact that the total niobium and titanium content in the support band is limited to at most 0.01% with a view to achieving a sufficient alternating torsion strength or bending fatigue strength. To improve the weldability, both materials of the saw band also contain aluminum, specifically in an amount of up to 2.0% in the cutting part and up to 0.15% in the support band.

Furthermore, Japanese laid-open specification 63-007 351 has described a bimetal saw band with a high toughness and fatigue strength made from a low-alloy steel comprising 0.25 to 0.50% of carbon, less than 1.5% of nickel, 2.00 to 6.00% of chromium, 0.20 to 1.00% of vanadium, 0.20 to 1.00% of molybdenum and/or less than 1.50% of tungsten, less than 0.30% of silicon, less than 0.50% of manganese, less than 0.015% of phosphorus and less than 0.005% of sulfur, with a total of 0.20 to 1.00% of molybendum and half the tungsten content, less than 0.0015% of oxygen, 0.02 to 0.20% of niobium and/or 0.02 to 0.20% of titanium, as well as a cutting part made from a high-speed steel.

Furthermore, U.S. Pat. No. 4,058,650 has disclosed a support band steel comprising 0.20 to 0.33% of carbon, up to 1.5% of silicon, up to 1.5% of manganese, 3.5 to 6.5% of chromium, 0.05 to 0.40% of vanadium, 0.05 to 0.10% of aluminum, 0.02 to 0.30% of niobium, 1.0 to 3.0% of molybdenum and/or up to 4.0% of tungsten, as well as a total amount of molybdenum and half the tungsten content of 1.0 to 3.0%, which, in order to improve the fatigue strength and toughness of the basic microstructure, may also contain up to 1.4% of cobalt and up to 1.5% of nickel. This support band material is intended to be distinguished by a low level of decarburization and by microstructural stability during welding to the cutting part, and should not lose its toughness either during a heat treatment of the cutting part or during tempering at relatively high temperatures with a view to the fatigue strength, ensuring a hardness of approximately HRC 50.

A particular problem to which hitherto little attention has been paid in practice consists in the fact that in saw bands the cutting power is dependent not only on the band speed (rotational speed) but also on the rate of advance of the saw band in the direction of the material being cut, i.e. on the compressive force applied. The evolution of heat, which increases as the cutting speed rises, however, limits the possible increase in the cutting speed in view of the limited thermal stability of the cutting teeth, and consequently the band speed cannot be increased as desired. However, the cutting performance can be improved with a higher advance or cutting pressure, since the saw teeth then penetrate more deeply into the material which is to be cut, and then the frictional heat which is produced during cutting is distributed better and is dissipated more successfully into the material which is to be cut. To ensure a clean or straight saw cut, moreover, a higher blade stress, which corresponds to the increased advance, is required, and this is only possible if the support band material has a sufficiently high bending fatigue strength.

The saw band advance or the pressure exerted can be increased with the aid of pressure-exerting rolls which act on the band spine. Pressure-exerting rolls of this type generally consist of hard metal and in the approximately linear region of contact with the band spine lead to a specific dynamic load on the support band material, which is associated with elastic but in some cases also plastic deformation of the band spine. On account of the high band speed and the linear contact between pressure-exerting roll and band spine, the deformation is always immediately followed by rapid and complete load relief. The band spine is therefore subject to a highly cyclical load with a high frequency.

The greater the hardness and the tensile strength of the material, the lower the deformation and the wear. The defining factor for the wear resistance is the carbon content. However, there are limits to the extent to which the carbon content can be increased, since the cyclical load mentioned and the frictional heat which is generated in the region of contact between band spine and pressure-exerting roll may locally result in austenitization and, in view of the rapid flux of heat into the cold part of the support band and possibly also into the workpiece which is to be cut, in the formation of a dynamically induced martensitic microstructure of a high hardness and brittleness. The friction-induced martensite formed leads to the formation of fine surface cracks which, on account of the rotation and the considerable bending of a saw band in the region of the guide rolls, propagate very quickly and then lead to destruction of the saw band. For example, even an edge zone of friction-induced martensite which is only 2 $\mu$m wide increases the likelihood of the band fracturing by a factor of 60.

The invention seeks to avoid the drawbacks which result from the use of a pressure-exerting roll.

To achieve this, the invention proposes a special support band material in the form of a steel comprising 0.25 to 0.35% of carbon, 0.3 to 0.5% of silicon, 0.8 to 1.5% of manganese, 1.0 to 2.0% of molybdenum, 1.5 to 3.5% of chromium, 0.5 to 1.5% of nickel, 0.5 to 2.5% of tungsten, 0.15 to 0.30% of vanadium, 0.05 to 0.10% of niobium, 0.05 to 1.0% of copper, up to 0.2% of aluminum, up to 1% of cobalt, remainder iron including melting-related impurities.

This steel is a suitable support-band material in particular when used in combination with saw teeth made from a high-speed steel comprising 1.0 to 2.0% of carbon, 3 to 6% of chromium, 1 to 5% of vanadium, 3 to 10% of molybdenum, 4 to 10% of tungsten, 4 to 10% of cobalt, up to 1% of silicon, up to 1% of manganese, up to 0.5% of niobium, up to 0.5% of nitrogen, remainder iron including melting-related impurities.

Preferably, however, the support band consists of a steel comprising 0.25 to 0.35% of carbon, 0.3 to 0.5% of silicon, 0.8 to 1.5% of manganese, 1.2 to 1.8% of molybdenum, 1.5 to 2.5% of chromium, 0.5 to 1.5% of nickel, 1.2 to 1.8% of tungsten, 0.1 to 0.8% of copper, 0.15 to 0.30% of vanadium, 0.05 to 0.10% of niobium, remainder iron including melting-related impurities.

Independently of this, a material which is particularly suitable for the cutting part of the saw band is a high-speed steel comprising 1.0 to 1.8% of carbon, 3.4 to 4.4% of chromium, 1.6 to 4.0% of vanadium, 3.2 to 6.5% of molybdenum, 6 to 10% of tungsten and 4 to 10% of cobalt.

The saw band according to the invention is distinguished by a high bending fatigue strength and, at the same time, by a high microstructural stability under dynamic compressive load, as well as a favorable welding performance when the support band is being joined to the cutting part, for example by laser or electron beam welding without filler. The favorable welding performance can be demonstrated by the fact that no hairline cracks are formed in the region of the melted zone and the hardness in the region of the weld seam or in the heat-affected zone is uniform with only a narrow fluctuation range.

The low susceptibility of the support band material with regard to the formation of friction-induced martensite even when a high pressure is applied is based primarily on its chromium, tungsten and molybdenum contents; these alloys shift the load limit out of that in which friction-induced martensite is formed to considerably higher pressures or rates of advance. The risk of friction-induced martensite being formed is particularly low if the ratio of the tungsten content to the molybdenum content is 0.6 to 1.5 or 0.8 to 1.4 and is preferably 1.

The presence of copper also has favorable effects with regard to the formation of friction-induced martensite and cracks as well as crack growth, since copper improves the microstructural stability even at high cooling rates. This applies not only to the region of the band spine, which is subject to load from the pressure-exerting rolls, but also, in the same way, to the weld seam between support band and cutting part. Finally, in the support band material according to the invention, the copper also replaces the aluminum which is otherwise required in the support band with a view to the toughness and strength of the welding zone.

Tests have shown that the width of the deformation zone in the region of the band spine of a support band according to the invention, with a band saw which is 1 mm thick, in the case of a pressure-exerting roll with a diameter of 12 mm and a pressure exerted of 2 kN, is only approximately 0.12 mm, and that at a band speed of 20 m/min, the band is moved onward by half the deformation width, i.e. by 0.06 mm, in just 0.18 millisecond.

Figure 2:
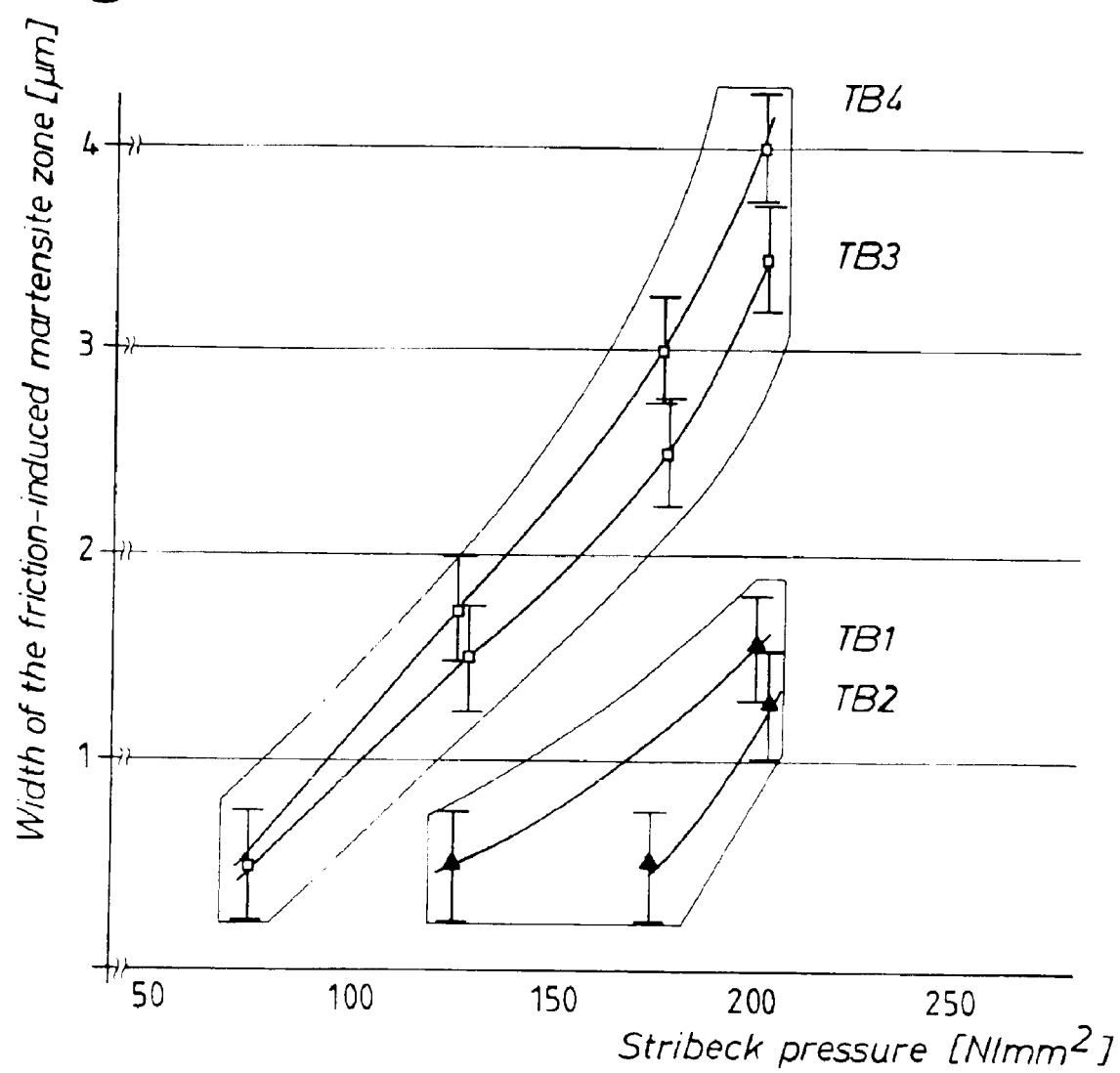
Figure 3:
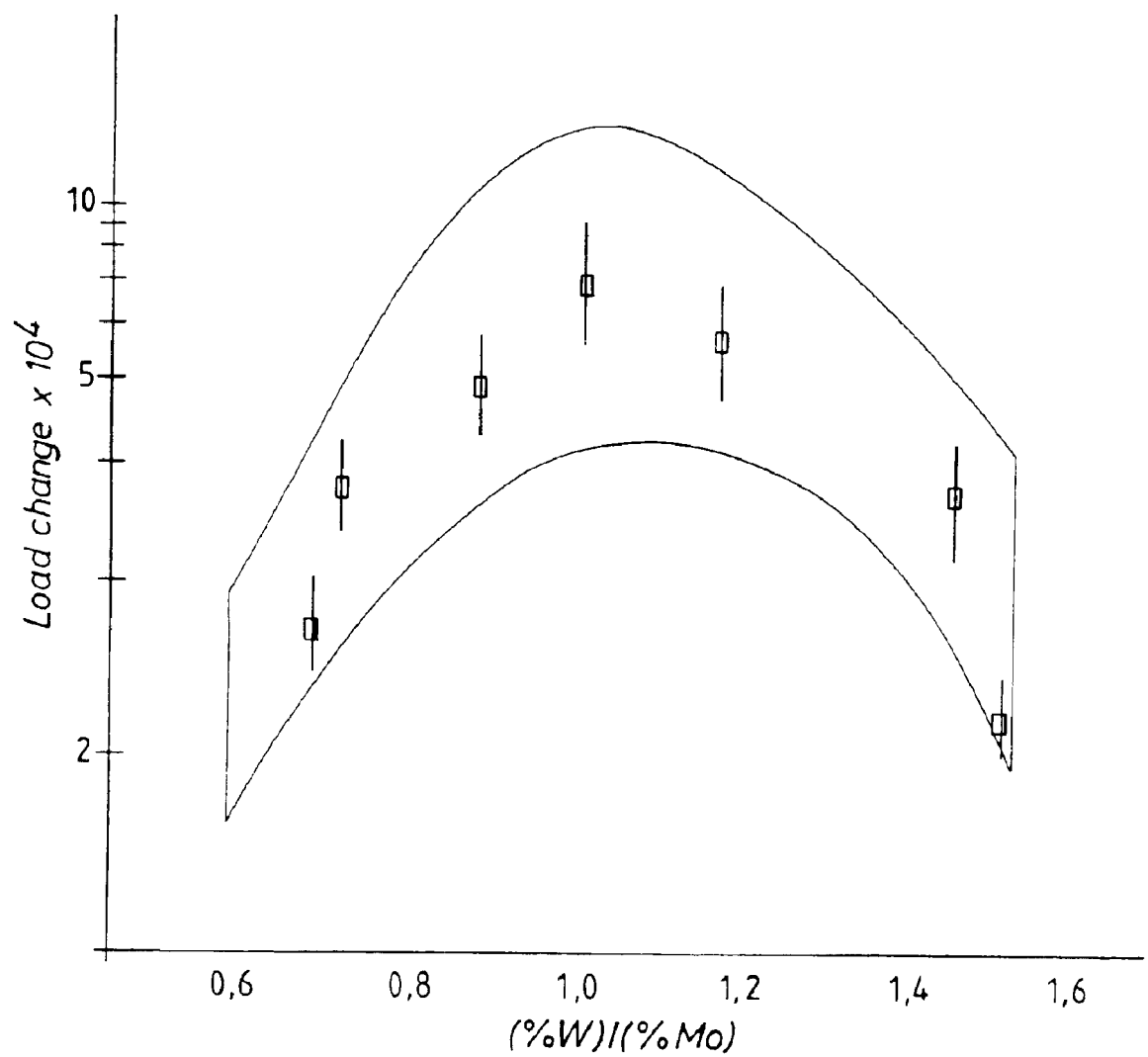

The invention is explained in more detail below with reference to exemplary embodiments and the drawings, in which:

FIG. 1 shows a perspective illustration of a machine used to test the stability of the band spine, FIG. 2 shows a graph illustrating the formation of friction-induced martensite as a function of the pressure exerted, and FIG. 3 shows the way in which the bending fatigue strength is dependent on the ratio of the tungsten content to the molybdenum content in the support band material.

Table I below shows two support band materials according to the invention TB1 and TB2 and two conventional support band materials TB3 and TB4, as well as four saw tooth materials Z1 to Z4 made from high-speed steel.

TABLE I

|     | % C  | % Si | % Mn | % Mo | % Cr | % Ni | % Co | % W   | % V  | % Nb |
|-----|------|------|------|------|------|------|------|-------|------|------|
| TB1 | 0.28 | 0.40 | 0.9  | 1.35 | 2.0  | 0.9  |      | 1.30  | 0.22 | 0.05 |
| TB2 | 0.26 | 0.43 | 1.0  | 1.50 | 1.9  | 1.0  |      | 1.53  | 0.26 | 0.08 |
| TB3 | 0.34 | 0.35 | 0.98 | 1.05 | 2.8  | 0.8  |      | 0.12  | 0.24 | 0.03 |
| TB4 | 0.30 | 0.32 | 0.95 | 1.2  | 3.6  | 0.7  |      | 0.05  | 0.30 | 0.05 |
| Z1  | 1.05 | 0.25 | 0.31 | 3.25 | 3.75 | 0.18 | 4.85 | 6.25  | 1.72 | 0.01 |
| Z2  | 1.48 | 0.18 | 0.20 | 5.25 | 3.75 | 0.1  | 9.05 | 10.05 | 3.15 | 0.02 |
| Z3  | 1.72 | 0.10 | 0.22 | 6.12 | 4.05 |      | 7.94 | 8.10  | 4.06 | 0.04 |
| Z4  | 1.13 | 0.22 | 0.21 | 9.27 | 3.95 | 0.3  | 7.8  | 1.35  | 1.23 | 0.01 |

Table II below shows the combinations of materials for five saw bands S1 to S5, specimens of which were tested with regard to their microstructural stability and bending fatigue strength.

TABLE II

| Saw band | Combination of materials | Comment |
|----------|--------------------------|---------|
| S1 | TB4 + Z4 | Standard specimens |
| S2 | TB1 + Z1 | Invention |
| S3 | TB1 + Z2 | Invention |
| S4 | TB2 + Z3 | Invention |
| S5 | TB2 + Z1 | Invention |

In the tests used to determine the microstructural stability of the support band material, specimens of the saw bands S1 to S5 were tested with the aid of the test equipment shown in FIG. 1. This equipment comprises a bed 1 for a swinging bench 2 which is moved in a reciprocating manner, with the aid of a crank drive comprising a driven wheel 3 and a connecting rod 4, as a function of the rotational speed of the wheel 3. The specimen 5 to be tested is clamped between the carriage 2 and a hard-metal roll 6 which is mounted rotatably in a U-shaped bracket 7. The variable compressive force F is introduced into the bracket via a mandrel 8.

The specimen 5 is secured against any movement with respect to the swinging bench 2, in a manner which is not illustrated in the drawing.

Depending on the rotational speed of the drive wheel 3, the test device can be used to simulate different band speeds at different pressures or different dynamic loads, since the velocity of the specimen is zero at the turning or dead center points and accordingly at these points there is always a constant drop in speed and increase in speed.

The factor K from the Stribeck rolling contact pressure in accordance with the formula K=F/(Dxleff) (G. Niemann, Maschinenelemente, Volume 1, pages 258/260; Springer Verlag 1975) was used for the (static) loading F of the roll 6. The Stribeck rolling contact pressure takes account of the specific load of the linear rolling contact between the pressure-exerting roll and the saw band spine.

The individual specimens made it possible to demonstrate, for a total of four load levels and with a speed of movement of the specimens of 20 m/min, the width of the boundary zone comprising friction-induced martensite resulting from partial etching for the support band materials according to the invention TB1 and TB2 compared to the two conventional support band materials TB3 and TB4. The diagram shown in FIG. 2 clearly demonstrates that the width of the friction-induced martensite zone as a function of the Stribeck pressure is significantly smaller for the specimens according to the invention TB1 and TB2 than for the comparative specimens TB3 and TB4.

To determine the bending fatigue strength, sheet-metal strips with dimensions of 8×1.35×80 mm and 20×1.5×80 mm were subjected to an austenitizing anneal at a temperature of 1180° C. under shielding gas followed by quenching and then tempering three times at 560° C.

The specimens were then subjected to an oscillating fatigue test in a displacement-controlled spring testing machine (Bosch spring rocker design) carrying out three-point bending threshold tests with a test stress of 583 N/mm2.

The essential components of the spring rocker are a swing beam, which at one end is held in a fixed bearing and at the other end is driven by a displaceable double eccentric, and two crossbars (baseplates), which can be displaced vertically in parallel by means of hand wheels, belonging to an upper and a lower test level. The displacement height of the eccentric can be set between 0 and 36 mm at intervals of 1.5 mm, and the displacement amplitude increases linearly from 0 (fixed bearing) to the maximum level at the eccentric. On both the lower test level and the upper test level there are up to six specimen holders, each with 16 specimen places next to one another.

The specimens are placed into the holders loosely at both ends and at two bearing points form bending bars which rest freely and have a free length L. To generate a suitable bending moment, the forces were introduced by central deflection, for which purpose a contact piece made from hard metal was arranged above each individual specimen and was positioned precisely in the center.

All the specimens belonging to one layer (level) were bent using a common contact strip. Each of the total of 12 contact strips was provided with 16 individual hard-metal contacts. Moreover, the contacts were arranged in an insulated manner on their bars, so that each specimen forms an independent circuit with the contact touching it. When one specimen broke, this circuit was interrupted and this fact was notified to a microprocessor via a cable, and the microprocessor assigned the current vibration number as the bending vibration number to the corresponding test position.

A known formula was used to calculate the test stress from the measured bending and the strip dimensions for a modulus of elasticity of 206,000 N/mm2.

The diagram shown in FIG. 3 shows the number of load changes as a function of the ratio of the tungsten content to the molybdenum content in the range from approximately 0.6 to approximately 1.5. A clear maximum is apparent at a ratio of 1.0.

In sawing tests using tubes made from materials number 1.4112, the service life of a conventional saw band S1 (standard specimen) at an initial cutting capacity of 20 cm2/min was assumed to be 100%, and the saw band according to the invention S2 resulted in a service life of 280%. A further test using the saw band S2 saw the pressure exerted by the saw band increased to such an extent that an initial cutting capacity of 35 cm2/min was the result. In this test, the service life was 230%. Further tests using saw bands S3 resulted in a service life of 340% with an initial cutting capacity of 35 cm2/min and, in the case of saw band S4, a service life of 345% for the same initial cutting capacity, while the saw band according to the invention S5, for an initial speed of 35 cm2/min, achieved a service life of 295%. By contrast, the service life of the conventional saw band S1 at the abovementioned initial cutting capacity was only 58%. This can be attributed to the formation of friction-induced martensite and resulting fatigue fractures in the band spine.

Overall, the tests demonstrate the high edge-zone stability of the saw band according to the invention under dynamic load even at high cutting capacities.

What is claimed:

1. A bimetal saw band, having a cutting part made from a high-speed steel, which includes a support band made from a steel comprising 0.25 to 0.35% of carbon 0.3 to 0.5% of silicon 0.8 to 1.5% of manganese 1.0 to 2.0% of molybdenum 1.5 to 3.5% of chromium 0.5 to 1.5% of nickel 0.5 to 2.5% of tungsten 0.15 to 0.30% of vanadium 0.05 to 0.10% of niobium 0.05 to 1.0% of copper up to 0.2% of aluminum up to 1% of cobalt remainder iron including melting related impurities.

2. A saw band, wherein the support band consists of a steel comprising 0.25 to 0.35% of carbon 0.3 to 0.5% of silicon 0.8 to 1.5% of manganese 1.2 to 1.8% of molybdenum 1.5 to 2.5% of chromium 0.5 to 1.5% of nickel 1.2 to 1.8% of tungsten 0.1 to 0.8% of copper 0.15 to 0.30% of vanadium 0.05 to 0.10% of niobium remainder iron including melting related impurities.

3. The saw band as claimed in claim 1, wherein at least the teeth of the cutting part consist of a steel comprising 1.0 to 2.0% of carbon 3 to 6% of chromium 1 to 5% of vanadium 3 to 10% of molybdenum 4 to 10% of tungsten 4 to 10% of cobalt up to 1% of silicon up to 1% of manganese up to 0.5% of niobium up to 0.5% of nitrogen reminder iron including melting-related impurities.

4. The saw band as claimed in claim 1, wherein at least the teeth of the cutting part consist of a steel comprising 1.0 to 1.8% of carbon
3.4 to 4.4% of chromium
1.6 to 4.0% of vanadium
3.2 to 6.5% of molybdenum
6 to 10% of tungsten
4 to 10% of cobalt
reminder iron including melting-related impurities.

5. The saw band as claimed in claim 1, wherein the ratio of the tungsten content to the molybdenum content is 0.5 to 1.5.

6. The saw band as claimed in claim 1, wherein the cutting part is produced by powder metallurgy.

7. The method of using the saw band as claimed in claim 1, comprising the step of using the saw band in combination with a pressure exerting roll acting on the band.

* * * * *